(12) United States Patent
Asplund et al.

(10) Patent No.: US 8,665,994 B2
(45) Date of Patent: Mar. 4, 2014

(54) ANTENNA DEVICE

(75) Inventors: Henrik Asplund, Stockholm (SE); Bo Göransson, Sollentuna (SE); Fredrik Ovesjö, Älvsjö (SE); Markus Ringström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 157 days.

(21) Appl. No.: 13/389,480

(22) PCT Filed: Dec. 15, 2009

(86) PCT No.: PCT/SE2009/051426
§ 371 (c)(1),
(2), (4) Date: Feb. 8, 2012

(87) PCT Pub. No.: WO2011/019310
PCT Pub. Date: Feb. 17, 2011

(65) Prior Publication Data
US 2012/0140801 A1 Jun. 7, 2012

Related U.S. Application Data

(60) Provisional application No. 61/233,972, filed on Aug. 14, 2009.

(51) Int. Cl.
*H04L 27/00* (2006.01)

(52) U.S. Cl.
USPC ........... 375/299; 375/260; 375/267; 375/295; 375/316; 375/346

(58) Field of Classification Search
USPC ......... 375/219, 224, 259, 260, 262, 267, 269, 375/270, 295, 299, 316, 322, 336, 340, 342, 375/344, 347, 350
See application file for complete search history.

(56) References Cited

U.S. PATENT DOCUMENTS

| | | | | |
|---|---|---|---|---|
| 8,112,049 | B2 * | 2/2012 | Tidestav | 455/129 |
| 8,406,328 | B2 * | 3/2013 | Mondal et al. | 375/260 |
| 8,488,728 | B2 * | 7/2013 | Maddah-Ali et al. | 375/350 |
| 8,571,488 | B2 * | 10/2013 | Cai et al. | 455/69 |
| 8,582,627 | B2 * | 11/2013 | Hammarwall et al. | 375/219 |

(Continued)

FOREIGN PATENT DOCUMENTS

| WO | 2007067107 A1 | 6/2007 |
|---|---|---|
| WO | 2008033089 A2 | 3/2008 |

*Primary Examiner* — Hirdepal Singh
(74) *Attorney, Agent, or Firm* — Murphy, Bilak & Homiller, PLLC

(57) ABSTRACT

The invention relates to the technical field of radio communications, and in particular to an antenna device for a radio base station, and a method for precoding data in a Multiple-Input Multiple-Output (MIMO) system. Embodiments of the invention disclose a secondary precoder 24 in series with a multiple-input multiple-output precoder 22. The secondary precoder 24 has a plurality of inputs 34, 36 and a plurality of outputs 38, 40. The second plurality of inputs being in communication with each plurality of outputs 38, 40 such that one or more signals input to a respective one or more of the second plurality of inputs 34, 36 provides a substantially equal power of signals at the second plurality of outputs 38, 40.

14 Claims, 4 Drawing Sheets

(56) References Cited

U.S. PATENT DOCUMENTS

| | | |
|---|---|---|
| 2007/0165736 A1 | 7/2007 | Wang et al. |
| 2010/0304691 A1* | 12/2010 | Goransson et al. ............. 455/69 |
| 2011/0032839 A1* | 2/2011 | Chen et al. ................... 370/252 |
| 2011/0228758 A1* | 9/2011 | Hammarwall et al. ....... 370/344 |
| 2011/0263281 A1* | 10/2011 | Cai et al. ...................... 455/501 |
| 2012/0201282 A1* | 8/2012 | Li et al. ......................... 375/219 |
| 2012/0287868 A1* | 11/2012 | Sambhwani et al. ......... 370/329 |
| 2013/0202058 A1* | 8/2013 | Asplund et al. ............... 375/295 |

* cited by examiner

ANTENNA DEVICE

TECHNICAL FIELD

The invention relates to the technical field of radio communications, and in particular to an antenna device for a radio base station, and a method for precoding data in a Multiple-Input Multiple-Output (MIMO) system.

BACKGROUND

The evolution of radio interface standards has been strongly focused on increased data rates, and in the Third Generation Partnership Project (3GPP) Release 7 a technology known as Multiple Input Multiple Output (MIMO) was introduced. Such technology uses multiple antennas at both the transmitter and receiver to theoretically double the downlink data rate using multiple data stream transmission.

Certain User Equipment (UE) categories are able to use MIMO technology, but other legacy UE categories are not be able to use MIMO technology. A network must be able to support both MIMO enabled and non-MIMO enabled UEs. Support for legacy UEs may be provided by transmitting all system vital information and traffic channels on a single antenna. However, if there are separate Power Amplifiers (PA) for the multiple antennas, which is typically the case, the utilization of the PAs is suboptimal. This is because one antenna may be transmitting and receiving much more data than another antenna which represents an under utilisation of resources. In effect there is no power sharing between the PAs.

The problem of uneven power sharing may be alleviated by using Butler matrices at a Base Transceiver Station (BTS), also known as the NodeB. Such Butler matrices distribute the load equally over the PAs, but have the drawback of requiring more hardware and introducing a power loss. Furthermore, Butler matrices are not always useable for power balancing if the data streams from the transmit antennas are correlated, which is the case for single stream MIMO used to support legacy UEs.

Another solution is to transmit all channels not using MIMO from the antennas through the use of Space-Time Transmit Diversity (STTD) encoding, which is an open loop transmit diversity scheme standardized in 3GPP Release 99. Such STTD encoding is supported by most UEs on the market. However, even though STTD transmission alleviates the PA power balancing problem and may be beneficial for common channels, there is less benefit for dedicated channels and in particular the High-Speed Downlink Shared Channel (HS-DSCH). The use of STTD encoding may actually harm the performance in certain cases, especially on the HS-DSCH which is a shared channel and a scheduled resource.

Typically, STTD encoding is designed to combat fast fading, but in the case of a scheduled channel, such as the HS-DSCH, STTD encoding may be harmful because the gain from scheduling stems from the fast fading as shown with reference to the experimental results shown in FIG. 4. Furthermore, demodulation equalization at the UE is more difficult when using STTD because the signal and the intra-cell interference now is transmitted from two antennas instead of one, which means that there is a higher interference rate between the antennas.

SUMMARY

It is desirable to provide a way of operating radio communications hardware more efficiently, and to reduce at least some of the above-mentioned power balancing problems.

According to a first aspect of the invention, there is provided an antenna device for a radio base station. The device comprising a multiple-input multiple-output (MIMO) precoder and a secondary precoder in series therewith. The multiple-input multiple-output precoder having a first plurality of inputs for a plurality of multiple-input multiple-output data streams, and a first plurality of outputs for the plurality of data streams. The secondary precoder having a second plurality of inputs and a second plurality of outputs. The second plurality of inputs being in communication with the first plurality of outputs. Each second plurality of inputs being in communication with each second plurality of outputs. Wherein the antenna device is operable such that one or more signals input to a respective one or more of the second plurality of inputs provides a substantially equal power of signals at the second plurality of outputs.

Such an antenna device provides the advantage of being able to balance the power between Power Amplifiers (PAs) associated with a respective antenna. Such power balancing is achieved by the secondary precoder which operates to split signal power input to each of the second inputs between each second output. The power balancing is achieved without the power loss associated with Butler matrices of the prior art.

Preferably the second plurality of outputs are in communication with respective antennas, the secondary precoder being operable to precode a plurality of signals input to the second plurality of inputs with a precoder matrix to provide an orthogonal amplitude and phase relation between the signals when emitted from the antennas. Such predocing provides the secondary precoder with the ability to condition signals as required to provide an optimised transmission from the antennas.

In a preferred embodiment the precoder matrix is defined by P:

$$P = \frac{1}{\sqrt{2}} \begin{pmatrix} 1 & e^{j\pi/4} \\ j & e^{-j\pi/4} \end{pmatrix}$$

Preferably the multiple-input multiple-output precoder is operable with a set of weights $w_1, w_2, w_3, w_4$ according to the Third Generation Partnership Project Technical Standard 25.214, the antenna device being operable to receive a non multiple-input multiple-output data stream to at least one of the second plurality of inputs and wherein the multiple-input multiple-output precoder is operable so that the $w_2$ weights $(1-j)/2$ and $(-1+j)/2$ are excluded to provide a substantially equal power of signals at the second plurality of outputs. Such exclusion of the $w_2$ weights $(1-j)/2$ and $(-1+j)/2$ has the advantage that power balancing is achieved if the input data streams are correlated.

Preferably the antenna device is operable to report at least one weight that is allowed from the set of weights. This arrangement permits the system side of the radio communications hardware to organise the weights that are excluded.

Preferably the multiple-input multiple-output precoder is operable with a set of weights $w_1, w_2, w_3, w_4$ according to the Third Generation Partnership Project Technical Standard 25.214, the antenna device being operable to receive a non multiple-input multiple-output data stream to at least one of the second plurality of inputs, and wherein a user device in communication with the antenna device is configured to report preferred multiple-input multiple-output precoder weights to the antenna device that provide a substantially equal power of signals at the second plurality of outputs. This arrangement permits the user device of the radio communications hardware to be involved with organising the weights that are excluded.

Preferably the user device and/or the antenna device are operable to agree at least one weight that is allowed from the set of weights.

Preferably the antenna device is operable such that the non multiple-input multiple output signal that is input to at least one of the second plurality of inputs is precoded at the second plurality of outputs to provide a polarization of the signals emitted from the antennas with substantially equal amplitudes for the horizontal and vertical polarisation components of its electric field vector. Such a polarisation avoids polarization mismatch for extended periods of time which is advantageous for legacy user equipment.

Preferably the user device is operable to exclude the $w_2$ weights $(1-j)/2$ and $(-1+j)/2$ without informing the antenna device that it has excluded them. Preferably the antenna device is operable to exclude the $w_2$ weights $(1-j)/2$ and $(-1+j)/2$ without informing the user device that it has excluded them. Such arrangements have the advantage of avoiding the need for either the antenna device or the user device to be involved with the said exclusion.

Preferably the secondary precoder is implemented at baseband.

Preferably the secondary precoder is operable such that a plurality of signals input to the second plurality of inputs are precoded at the second plurality of outputs to provide a substantially vertical and horizontal polarization of the signals emitted from the antennas. Such polarizations may have the advantage of experiencing less inter-stream interference compared to data streams transmitted on other pairs of orthogonal polarizations.

According to a second aspect of the invention there is provided a transmitter including an antenna device according to the first aspect of the invention.

According to a third aspect of the invention there is provided a method for precoding data in a multiple-input multiple-output (MIMO) system. The multiple-input multiple-output system having a multiple-input multiple-output precoder and a secondary precoder in series therewith. The multiple-input multiple-output precoder having a first plurality of inputs for a plurality of multiple-input multiple-output data streams. The multiple-input multiple-output precoder having a first plurality of outputs for the plurality of data streams. The secondary precoder having a second plurality of inputs and a second plurality of outputs. The second plurality of inputs being in communication with the first plurality of outputs. Each second plurality of inputs being in communication with each second plurality of outputs. The second plurality of outputs being in communication with respective antennas. The method including receiving one or more signals at a respective one or more of the second plurality of inputs. The method including precoding the said signals at the secondary precoder to provide a substantially equal power of the said signals at the second plurality of outputs.

Such a method provides the advantage of being able to balance the power between PAs associated with a respective antenna. Such power balancing is achieved by using the secondary precoder which operates to split signal power input to each of the second inputs between each second output. The power balancing is achieved without the power loss associated with Butler matrices of the prior art.

Preferably the method further includes precoding a plurality of signals input to the second plurality of inputs with a precoder matrix to provide an orthogonal amplitude and phase relation between the signals emitted from the antennas.

Such precoding provides the secondary precoder with the ability to condition signals as required to provide an optimised transmission from the antennas.

In a preferred embodiment the precoder matrix is defined by P:

$$P = \frac{1}{\sqrt{2}} \begin{pmatrix} 1 & e^{j\pi/4} \\ j & e^{-j\pi/4} \end{pmatrix}$$

Preferably the method further includes operating the multiple-input multiple-output precoder with a set of weights $w_1$, $w_2$, $w_3$, $w_4$ according to the Third Generation Partnership Project Technical Standard 25.214, inputting a non multiple-input multiple-output data stream to at least one of the second plurality of inputs, and operating the multiple-input multiple-output precoder so that the $w_2$ weights $(1-j)/2$ and $(-1+j)/2$ are excluded to provide a substantially equal power of signals at the second plurality of outputs. Such exclusion of the certain $w_2$ weights provides the advantage that power balancing is achieved if the input data streams are correlated.

Preferably the method further includes the MIMO system reporting at least one weight that is allowed from the set of weights. This arrangement permits the system side of the radio communications hardware to organise the weights that are excluded.

Preferably the method further includes operating the multiple-input multiple-output precoder with a set of weights $w_1$, $w_2$, $w_3$, $w_4$ according to the Third Generation Partnership Project Technical Standard 25.214, inputting a non multiple-input multiple-output data stream to at least one of the second plurality of inputs, and operating a user device in communication with the antenna device to report preferred multiple-input multiple-output precoder weights to the antenna device that provide a substantially equal power of signals at the second plurality of outputs. This arrangement permits the user device of the radio communications hardware to be involved with organising the weights that are excluded.

Preferably the method further includes operating the user device and/or the multiple-input multiple-output system to agree at least one weight that is allowed from the set of weights.

Preferably the method further includes precoding the non multiple-input multiple output signal that is input to at least one of the second plurality of inputs to provide a polarization of the signals emitted from the antennas with substantially equal amplitudes for the horizontal and vertical polarisation components of its electric field vector. Such a polarisation avoids polarization mismatch for extended periods of time which is advantageous for legacy user equipment.

Preferably method further includes operating the user device to exclude the $w_2$ weights $(1-j)/2$ and $(-1+j)/2$ without informing the multiple-input multiple-output system that it has excluded them. Preferably the method further includes operating the multiple-input multiple-output system to exclude the $w_2$ weights $(1-j)/2$ and $(-1+j)/2$ without informing the user device that it has excluded them. Such arrangements have the advantage of avoiding the need for either the antenna device or the user device to be involved with the said exclusion.

Preferably the method further includes precoding a plurality of signals input to at least one of the second plurality of inputs to provide a substantially vertical and horizontal polarization of the signals emitted from the antennas. Such polarizations may have the advantage of experiencing less inter-stream interference compared to data streams transmitted on other pairs of orthogonal polarizations.

According to a fourth aspect of the invention there is provided a communications network including an antenna device according to the first aspect of the invention, or including a transmitter according to the second aspect of the invention, or using a method according to the third aspect of the invention.

According to a fifth aspect of the invention there is provided a radio base station including an antenna device according to the first aspect of the invention, or using a method according to the third aspect of the invention.

According to a sixth aspect of the invention there is provided a computer program product operable to control the antenna device according to the first aspect of the invention, or the transmitter of the second aspect of the invention, or the radio base station according to the fifth aspect of the invention, or to perform a method according to the third aspect of the invention.

According to an alternative characterisation of the invention there is provided an antenna device for a radio base station. The device comprising a common precoder having a first plurality of inputs and a first plurality of outputs. The first plurality of inputs for receiving at a respective data stream. Each first plurality of inputs being in communication with each first plurality of outputs. The antenna device being operable such that one or more signals input to a respective one or more of the first plurality of inputs provides a substantially equal power of signals at the first plurality of outputs.

Preferably the secondary precoder is arranged in series with a multiple-input multiple-output (MIMO) precoder which has a second plurality of inputs for a plurality of multiple-input multiple-output data streams, and a second plurality of outputs for the plurality of data streams, the second plurality of outputs in communication with the first plurality of inputs.

According to another alternative characterisation of the invention there is provided a method for precoding data in a multiple-input multiple-output (MIMO) system. The multiple-input multiple-output system having a multiple-input multiple-output precoder with a first plurality of inputs for a plurality of multiple-input multiple-output data streams, and a first plurality of outputs. The method including using a secondary precoder in series with the multiple-input multiple-output precoder. The secondary precoder having a second plurality of inputs and a second plurality of outputs. The second plurality of inputs being in communication with the first plurality of outputs. The second plurality of outputs being in communication with respective antennas. Each second plurality of inputs being in communication with each second plurality of outputs. The method including operating the secondary precoder such that one or more signals input to a respective one or more of the second plurality of inputs provides a substantially equal power of signals at the second plurality of outputs.

Optional features of the first and third characterisations of the invention may be used with the alternative characterisations of the invention respectively.

BRIEF DESCRIPTION OF THE DRAWINGS

Other features of the invention will be apparent from the following description of preferred embodiments shown by way of example only with reference to the accompanying drawings, in which.

DETAILED DESCRIPTION

Figure 1:
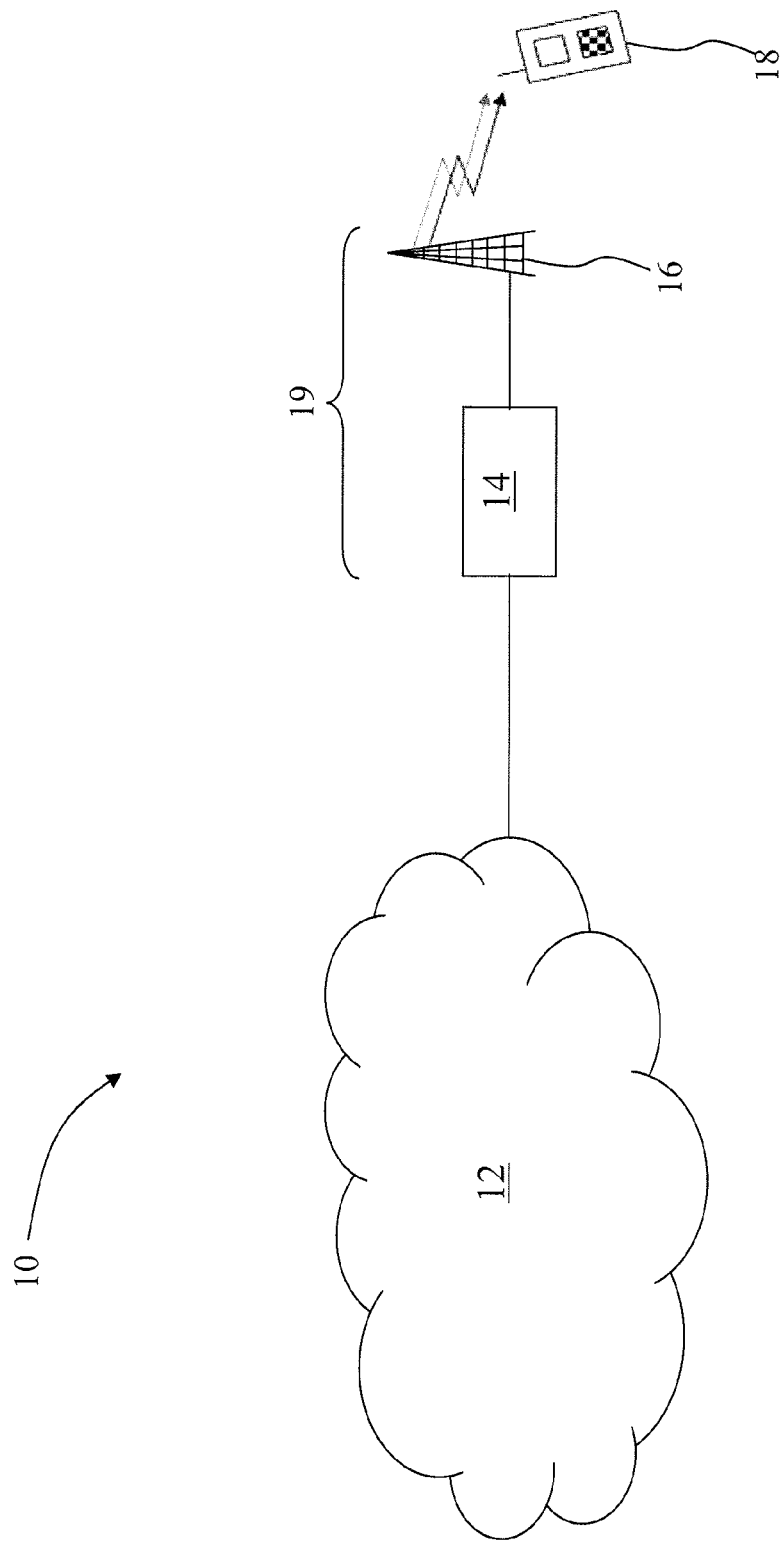
FIG. 1 shows a diagram of a mobile communications network for describing embodiments of the invention.

FIG. 1 shows a diagram of a mobile communications network for describing embodiments of the invention, generally designated 10. The mobile communications network 10 comprises a core network 12 in communication with a Base Transceiver Station (BTS) 14, alternatively known as a NodeB, or a radio base station. The BTS 14 has an antenna arrangement 16 for communication with at least one user device 18. Together the BTS 14, the antenna arrangement 16, and the at least one user device 18 form a Multiple-Input Multiple-Output (MIMO) system 19.

Figure 2:
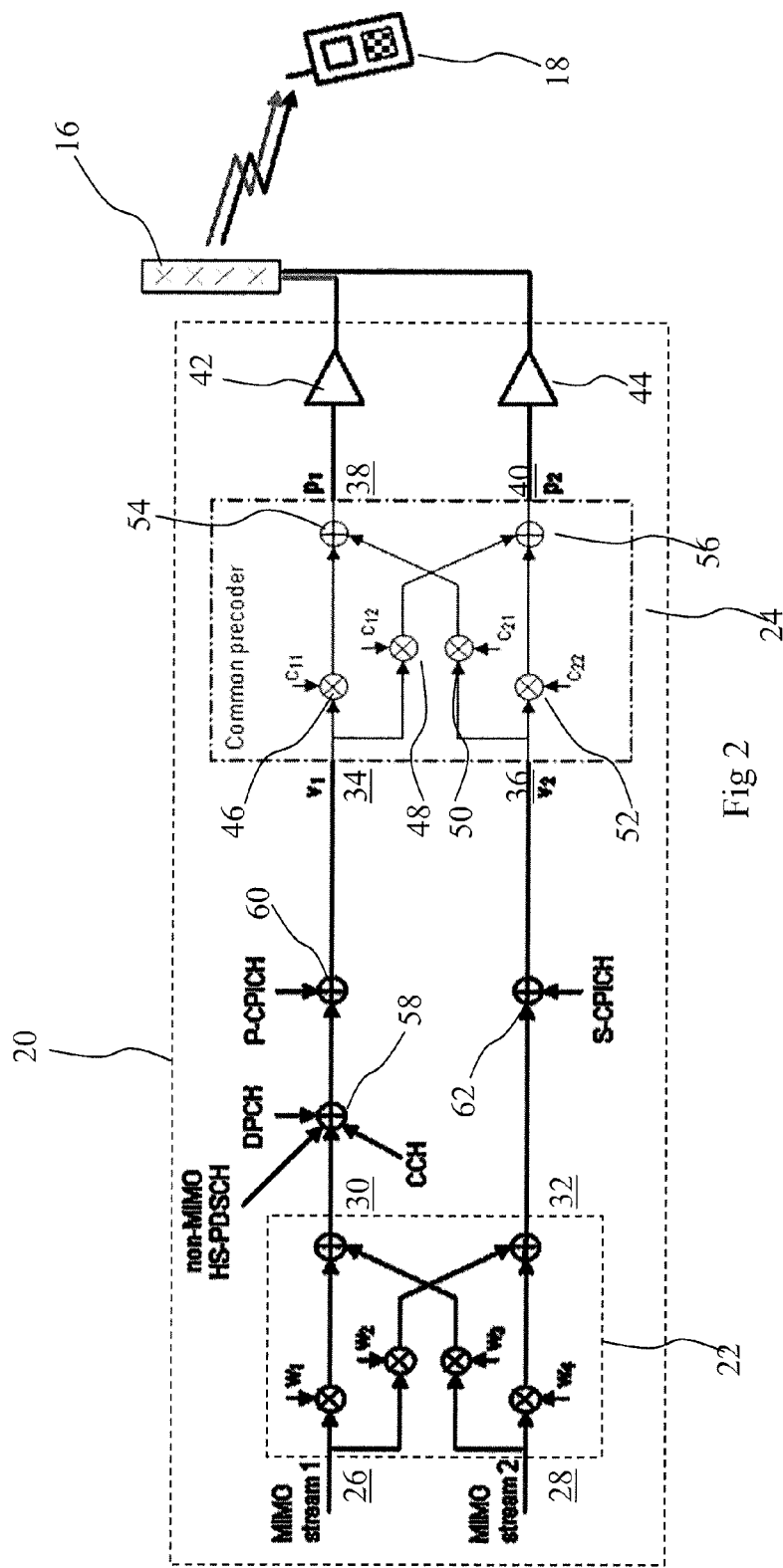
FIG. 2 is a schematic diagram of an antenna device according to an embodiment of the invention.

FIG. 2 is a schematic diagram of an antenna device according to an embodiment of the invention, generally designated 20. Like features to the arrangements of FIG. 1 are shown with like reference numerals. In FIG. 2 the antenna device 20 is a device located inside the BTS 14 of FIG. 1. FIG. 2 shows the antenna device 20 to comprise a MIMO precoder 22 in communication with a secondary precoder 24, also known as a common precoder. The MIMO precoder 22 has a first input 26 and a second input 28 for receiving MIMO data streams 1 and 2 respectively. The inputs 26, 28 are in communication with a first output 30 and a second output 32 of the MIMO precoder 22. The MIMO precoder 22 is a known item according to the Third Generation Partnership Project Technical Standard 25.214 and will not be described further other than to mention that it is operable with a known set of precoding weights $w_1, w_2, w_3, w_4$. The precoding weights $w_1$ and $w_3$ are constant real valued scalars, and the precoding weights $w_2$ and $w_4$ are variable complex valued scalars. The weights $w_1, w_2, w_3, w_4$ are given by:

$$w_3 = w_1 = 1\sqrt{2}$$
$$w_4 = -w_2$$
$$w_2 \in \left\{ \frac{1+j}{2}, \frac{1-j}{2}, \frac{-1+j}{2}, \frac{-1-j}{2} \right\}$$

The secondary precoder 24 has a first input port 34, a second input port 36, a first output port 38, and a second output port 40. The input ports 34, 36 may be known as virtual antenna ports $v_1, v_2$, and the output ports 38, 40 may be known as physical antenna ports $p_1, p_2$. Each output port 38, 40 is in communication with a respective Power Amplifier 42, 44, which are in turn in communication with a respective antenna of the antenna arrangement 16. It will be appreciated that the antenna arrangement 16 shown comprises a MIMO composite antenna with slant +45°/−45° dual-polarised antennas according to known arrangements. Such slant +45°/−45° dual-polarized antennas are by far the most common site installation utilized. The first output port 30 of the MIMO precoder 22 is in communication with the first input port 34 of the secondary precoder 24. The second output port 32 of the MIMO precoder 22 is in communication with the second input port 36 of the secondary precoder 24.

A signal input to the first input port 34 is split and input to two respective multiplier devices 46, 48. Similarly, a signal input to the second input port 36 is split and input to two respective multiplier devices 50, 52. The splitting of the signals is arranged so that an equal power signal is input to the multiplier devices 46, 48, and to the multiplier devices 50, 52. The multiplier devices 46, 48, 50, 52 are operate to transform, or precode, the signals input thereto by multiplying them with a value according to the precoder matrix defined by P:

$$P = \begin{pmatrix} c_{11} & c_{21} \\ c_{12} & c_{22} \end{pmatrix} = \frac{1}{\sqrt{2}} \begin{pmatrix} 1 & e^{j\pi/4} \\ j & e^{-j\pi/4} \end{pmatrix} \quad (1)$$

The value $c_{11}$ is applied at the multiplier 46, the value $c_{12}$ is applied at the multiplier 48, the value $c_{21}$ is applied at the multiplier 50, and the value $c_{22}$ is applied at the multiplier 52. The output of the multiplier 46 and the output of the multiplier 50 are combined at a combiner 54. The output of the multiplier 48 and the output of the multiplier 52 are combined at a combiner 56. The combiners 54, 56 operate to add signals input thereto and pass the respective combined signals to the outputs 38, 40. Accordingly, the operation of the secondary precoder 24 can be given by the following equation:

$$\begin{pmatrix} p_1 \\ p_2 \end{pmatrix} = \frac{1}{\sqrt{2}} \begin{pmatrix} 1 & e^{j\pi/4} \\ j & e^{-j\pi/4} \end{pmatrix} \begin{pmatrix} v_1 \\ v_2 \end{pmatrix} \quad (2)$$

The precoder matrix P imparts an orthogonal polarization and a phase shift between the signals output from the antenna arrangement 16. Since the power of data signals input to the multipliers 46, 48 and the multipliers 50, 52 is the same, the signals output from the outputs 38, 40 of the secondary precoder 24 have an equal power. This means that full power balancing is achieved for the PAs 42, 44. Whereas the precoder matrix is defined by P, it will be appreciated that other precoder matrices may be used to provide signals at the antenna arrangement 16 that are not orthogonal, but that are substantially orthogonal, or slightly away from orthogonal.

In the embodiment shown the secondary precoder 24 is implemented at baseband, which is prior to up-conversion of the data signals to Radio Frequency. Implementing the secondary precoder 24 at baseband is a convenient way for performing the transformation, but it will be appreciated that the precoder 24 could alternatively be implemented at different parts of the network 10, or the BTS 14, such as in the digital parts of the BTS 14 or in the analogue parts of the BTS 14.

Also shown in FIG. 2 are first and second data stream combiners 58, 60 which are arranged in series between the first output port 30 of the MIMO precoder 22 and the first input port 34 of the secondary precoder 24. A third data stream combiner 62 is also shown between the second output port 32 of the MIMO precoder 22 and the second input port 36 of the secondary precoder 24. The first data stream combiner 58 is shown to be able to receive data sent over a non-MIMO High-Speed Physical Downlink Shared Channel (HS-PD-SCH), a Dedicated Physical Channel (DPCH), or a Common Channel (CCH). The second data stream combiner 60 is shown to be able to receive data sent over a first Common Pilot Channel (P-CPICH). The third data stream combiner 62 is shown to be able to receive data sent over a second Common Pilot Channel (S-CPICH). It will be appreciated that the data sent over HS-PDSCH, DPCH, CCH, P-CPICH, or S-CPICH is input after the MIMO precoder 22 and before the secondary precoder 24.

Whereas the secondary precoder 24 provides power balancing at the PAs 42, 44 for dual stream MIMO signals, such power balancing in not guaranteed if the input data streams are correlated, which is the case for single stream MIMO signals. In this context one signal is correlated with another signal if the signals are identical but at different phase. This potential problem is avoided by inputting the single stream MIMO signal, such as a non-MIMO signal over the HS-PDSCH, at the first data stream combiner 58 and excluding the $w_2$ weights $(1-j)/2$ and $(-1+j)/2$ at the MIMO precoder 22. This arrangement provides a polarization of the signals at the antenna arrangement 16 with substantially equal amplitudes for the horizontal and vertical polarisation components of its electric field vector. This arrangement means that at the user device 18, which may be a legacy non MIMO device, the polarisation varies over time due to reflections.

The precoder matrix P provides good performance for single and dual stream MIMO signals, as well as for Single-Input Single Output (SISO) signals and Single-Input Multiple-Output (SIMO) signals. Using the precoder matrix P, power balancing at the PAs 42, 44 is achieved for SISO, single stream MIMO and dual stream MIMO. Using the precoder matrix P, the dual stream MIMO signals are transmitted from the antenna arrangement 16 on orthogonal polarizations, which are vertically and horizontally polarized. This is an advantageous arrangement because such vertically and horizontally polarized signals are statistically optimal for transmission, and have less inter-stream interference when compared to other pairs of orthogonal polarizations. Thus, it is desirable to ensure that one set of the MIMO precoder weights $w_1$, $w_2$, $w_3$, $w_4$ in combination with the precoder matrix P results in vertical and horizontal polarizations for the MIMO signals transmitted from the antenna arrangement 16. With the most commonly installed phase-calibrated slant $+45°/-45°$ base station antennas, the required combined effective weights of the MIMO precoder 22 and the secondary precoder 24 are [1 1] and [1 -1] which may be applied with a complex scaling factor, as per the precoder matrix P. It will be appreciated that if the antenna arrangement 16 is equipped with vertically and horizontally polarized antennas a precoder matrix [1 1; 1 -1] can be used at the secondary precoder 24 to obtain the same properties as the precoder matrix P when using phase-calibrated slant $+45°/-45°$ base station antennas.

It will be appreciated that when transmitting SISO signals from the antenna arrangement 16, the precoder matrix P together with the exclusion of the $w_2$ weights $(1-j)/2$ and $(-1+j)/2$ results in a polarization received at the user device 18 that varies over time. This is advantageous because legacy mobile devices 18 may not be able to handle signals that are transmitted on non-varying polarizations such as polarizations solely consisting of a vertical or a horizontal polarization. Such a polarization that varies over time may include elliptic polarization, circular polarization or $+45°/-45°$ polarizations. It will be appreciated by the skilled person that the most suitable polarizations are those that contain equal power on both orthogonal projections. It will also be appreciated that the circular polarizations are the only polarisations that can fully utilize both PAs 42, 44 while maintaining equal power on the vertical and horizontal components.

The antennas of the antenna array 16 may be calibrated or non-calibrated. In the case where the antennas are calibrated the resulting polarization by applying the precoder matrix P will be vertical and horizontal polarizations for MIMO signals, and circular polarization for SISO signals. In the case where the antennas are not calibrated the polarization of the MIMO signals by applying the precoder matrix P will be random and orthogonal, and the polarization of the SISO signal will be elliptic with the extreme cases being circular polarization, and horizontal and vertical polarizations.

The two signals at the outputs 38, 40 are transmitted from a pair of antennas in the antenna arrangement 16 that are orthogonally polarized with respect to each other. Operation of a MIMO precoder 22, or a combination of the MIMO precoder 22 and secondary precoder 24 maps a certain information stream onto both outputs 38, 40. When power balancing at the PAs 42, 44 is achieved, the signal streams present at the outputs 38, 40 have equal magnitude and may have a phase shift. When the two data stream present at the outputs 38, 40 are radiated from respective antennas at the antennas arrangement 16, the radiated electromagnetic waves will be a superposition of the waves from each antenna. The polarization of these waves will be a function of both the respective antenna polarizations, and also of the phase shift between the data streams present at the outputs 38, 40. For example, if the antenna polarizations at the antenna arrangement 16 are +45° slant linear and −45° slant linear, and the phase shift is 0°, the resulting polarization will be vertical. If the phase shift is 90° instead of 0°, an electromagnetic field vector will rotate as a function of time, resulting in circular polarization.

Figure 3:
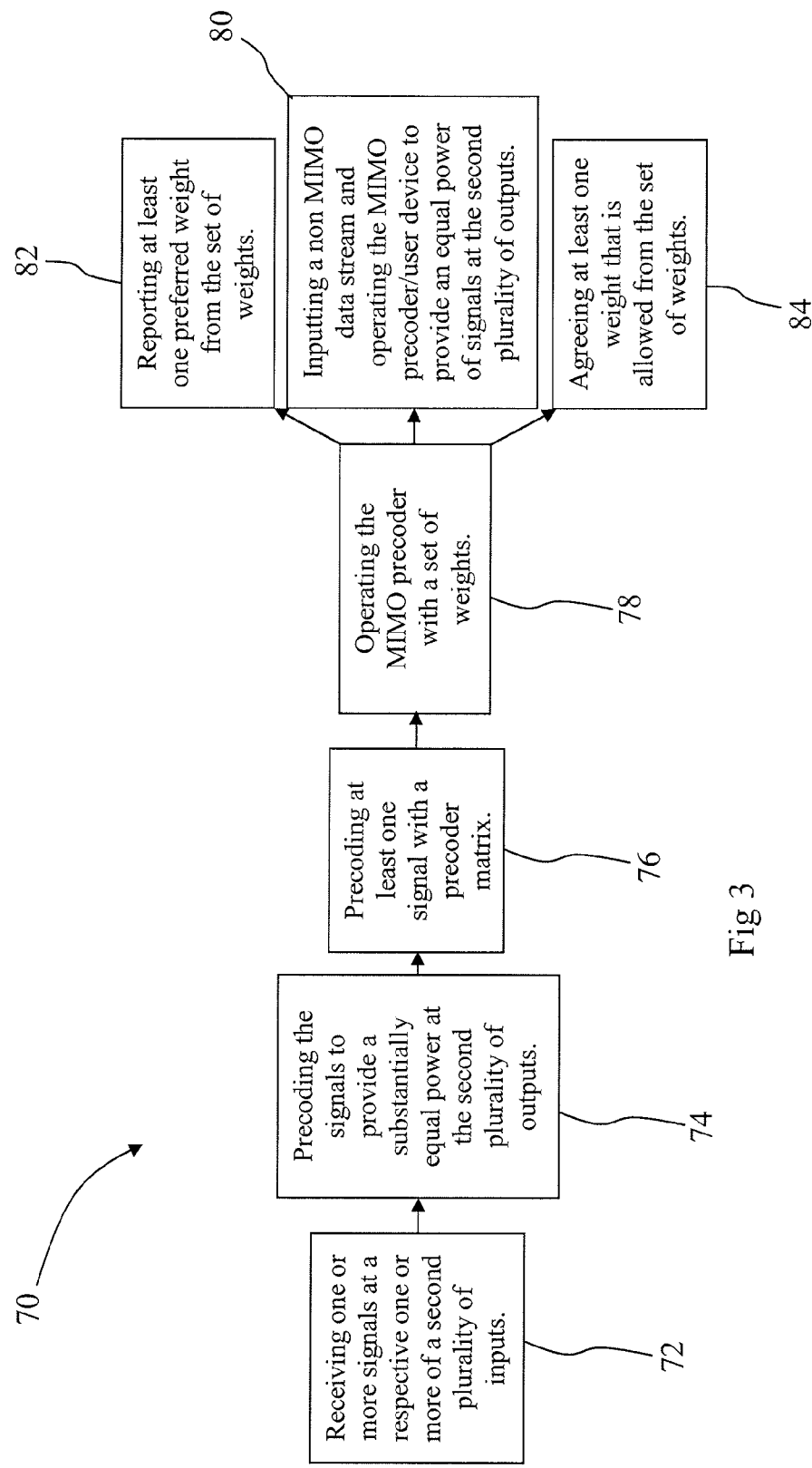
FIG. 3 shows a flow diagram illustrating a method according to an embodiment of the invention.

FIG. 3 shows a flow diagram illustrating a method according to an embodiment of the invention, generally designated 70. The method relates to the operation of the antenna device shown in FIG. 2. In FIG. 3 the method is suitable for precoding data in a multiple-input multiple-output (MIMO) system having a multiple-input multiple-output precoder 22 and a secondary precoder 24 in series therewith, the multiple-input multiple-output precoder 22 having a first plurality of inputs 26, 28 for a plurality of multiple-input multiple-output data streams, and a first plurality of outputs 30, 32 for the plurality of data streams, the secondary precoder having a second plurality of inputs 34, 36 and a second plurality of outputs 38, 40, the second plurality of inputs 34, 36 being in communication with the first plurality of outputs 30, 32, each second plurality of inputs 34, 36 being in communication with each second plurality of outputs 38, 40, and the second plurality of outputs 38, 40 being in communication with respective antennas 16. The method includes receiving one or more signals at a respective one or more of the second plurality of inputs 34, 36, as shown at 72. The method includes precoding the said signals at the secondary precoder 24 to provide a substantially equal power of the said signals at the second plurality of outputs 38, 40, as shown at 74.

The method includes precoding a plurality of signals input to the second plurality of inputs with a precoder matrix, as shown at 76, to provide an orthogonal amplitude and phase relation between the signals emitted from the antennas. The method includes defining 76 the precoder matrix as P which is given by:

$$P = \begin{pmatrix} c_{11} & c_{21} \\ c_{12} & c_{22} \end{pmatrix} = \frac{1}{\sqrt{2}} \begin{pmatrix} 1 & e^{j\pi/4} \\ j & e^{-j\pi/4} \end{pmatrix}$$

The method includes operating the multiple-input multiple-output precoder with a set of weights $w_1$, $w_2$, $w_3$, $w_4$ according to the Third Generation Partnership Project Technical Standard 25.214, as shown at 78. The method further includes inputting a non multiple-input multiple-output data stream to at least one of the second plurality of inputs, and operating the multiple-input multiple-output precoder so that the $w_2$ weights $(1-j)/2$ and $(-1+j)/2$ are excluded to provide a substantially equal power of signals at the second plurality of outputs, as shown at 80. The method includes the MIMO system reporting at least one weight that is allowed from the set of weights as shown at 82.

The method includes operating the multiple-input multiple-output precoder with a set of weights $w_1$, $w_2$, $w_3$, $w_4$ according to the Third Generation Partnership Project Technical Standard 25.214 as shown at 78. The method includes inputting a non multiple-input multiple-output data stream to at least one of the second plurality of inputs, and operating a user device in communication with the antenna device to report preferred multiple-input multiple-output precoder weights to the antenna device that provide a substantially equal power of signals at the second plurality of outputs, as shown at 80.

The method further includes operating the user device and/or the multiple-input multiple-output system to agree at least one weight that is allowed from the set of weights, as shown at 84.

The method includes precoding the non multiple-input multiple output signal that is input to at least one of the second plurality of inputs to provide a polarization of the signals emitted from the antennas with substantially equal amplitudes for the horizontal and vertical polarisation components of its electric field vector, as shown at 76.

The method includes precoding 76 a plurality of signals input to at least one of the second plurality of inputs to provide a substantially vertical and horizontal polarization of the signals emitted from the antennas.

It will be appreciated that the embodiments described above with reference to FIGS. 1-3 allow three different modes of operation which are non MIMO operation, single stream MIMO operation, and dual stream MIMO operation. With non MIMO operation, which is applicable to legacy user devices, the data to be communicated follows the path from the first data stream combiner 58, to the secondary precoder 24, and then to the antenna arrangement 16. The user device 18 estimates the channel conditions using the P-CPICH signal and feeds this information back to the antenna device 20. It will be appreciated that the effect of the secondary precoder 24 and the exclusion of the $w_2$ weights $(1-j)/2$ and $(-1+j)/2$ at the MIMO precoder 22 will result in equal utilization of the PAs 42, 44. For power balancing at the PAs 42, 44, the weights $c_{11}$ and $c_{12}$ need to have the same magnitude, although the phase can be different. However, if $C_{11}$ and $c_{12}$ are of equal magnitude and the secondary precoder 16 provides an orthogonal transformation at the antennas 16, it is impossible to simultaneously achieve power balancing at the PAs 42, 44 for all possible weights $w_1$, $w_2$, $w_3$, $w_4$ that may be applied at the MIMO precoder 22. It has been shown above that it is possible to achieve power balancing at the PAs 42, 44 for two of the four available $w_2$ weights at the MIMO precoder 22 if the weights applied at the secondary precoder 22 are selected in a certain manner according to the precoder matrix P. The non MIMO signals are transmitted from the antenna arrangement 16 with a polarization having equal magnitude for its projection on the horizontal polarization, as its projection on the vertical polarization. If the antennas of the antenna arrangement 16 are slant +45/−45 linearly polarized, and power balancing at the PAs 42, 44 is to be achieved, the polarization of the non MIMO signals can only be either right-hand circular or left-hand circular. As previously mentioned, the benefit of such an arrangement is that the polarization of the radiated waves when they arrive at the user device 18 will be continuously varying due to the uncorrelated fading of the vertical and the horizontal components in the wireless radio channel. In this case, the necessary phase shift between the signals at the outputs 38, 40 is +90 degrees or −90 degrees, which can be expressed in MATLAB notations as:

$$c12=c11*\exp(\pm i*\text{pi}/2).$$

With single stream MIMO operation, applicable to MIMO enabled user devices, the data to be communicated follows the path from the first input 26 via the MIMO precoder 22, to the secondary precoder 24, and then to the antenna arrangement 16. The weights to be applied at the MIMO precoder 22 are user-specific, and are selected from the set of available weights by means of feedback from the user device 18 of the preferred set of weights. The user device 18 determines a preferred set of MIMO precoder weights by utilizing separately estimated channel conditions from the two virtual antennas $v_1$, $v_2$, which in turn is obtained using the P-CPICH and the S-CPICH signals respectively. From the channel conditions, the user device 18 then calculates which of the MIMO precoder weights give the best communication channel. The MIMO precoder weights $w_3$ and $w_4$ are not applied with single stream MIMO operation, so the user simply reports which of the four possible values for $w_2$ that it prefers. For single stream MIMO operation, the effect of the MIMO precoder 22 and the secondary precoder 24 will result in equal utilization of the PAs 42, 44. Furthermore, the two MIMO streams transmitted from the antenna arrangement 16 will be vertical polarization and horizontal polarization respectively. The advantage of this arrangement is that there is little cross-scattering between these two polarizations in the wireless radio channel and hence the inter-stream interference will be smaller. Thus, the receiver at the user device 18 can more easily restore the orthogonality between the two MIMO streams leading to better performance and higher data throughput.

With dual stream MIMO operation, applicable to MIMO enabled user devices, two separate streams of information input to the first and second inputs 26, 28 are utilised for a higher data throughput. In all other respects, dual steam MIMO operation is similar to single stream MIMO operation, whereby the user device 18 reports the preferred $w_2$ value. It will be appreciated that dual stream MIMO operation is possible as long as the first and the second streams are orthogonal to each other, and since the the MIMO precoder 22 and secondary precoder 24 are operated with orthogonal matrices, the two streams will be orthogonal from the antenna arrangement 16. For dual stream MIMO operation, the effect of the MIMO precoder 22 and the secondary precoder 24 will result in equal utilization of the PAs 42, 44. For optimal dual stream MIMO operation, the secondary precoder 24 needs to provide an orthogonal transformation, i.e. the orthogonal input signals on the first and second input ports 34, 36 need to be mapped to orthogonal linear combinations on the output ports 38, 40. This is necessary to preserve the separation between the first and the second MIMO streams, and also to retain the power balancing properties of the dual stream MIMO signals. The condition of orthogonality can be expressed in MATLAB notations as:

$$[c11\ c12]*\text{conj}([c21;\ c22])=c11*\text{conj}(c21)+c12*\text{conj}(c22)=0.$$

The two MIMO streams are transmitted from the antenna arrangement 16 on vertical polarization and horizontal polarization respectively. The advantage of this arrangement is that there is little cross-scattering between these two polarizations in the wireless radio channel and hence the inter-stream interference will be smaller. Thus, the receiver at the user device 18 can more easily restore the orthogonality between the two MIMO streams leading to better performance and higher throughput.

The BTS 14 may be simultaneously configured to operate more than one mode of operation depending on the capabilities of the different user devices in a mobile cell which it is serving. For example legacy devices, single stream devices, and dual stream devices may be present in the cell at the same time. A MIMO enabled user device 18 will report whether it prefers single stream MIMO or dual stream MIMO operation, and this can change rapidly due to changing channel conditions.

It can be seen that the embodiments of the invention described above provide substantially equal utilization of the two PAs 42, 44 for all three modes of operation. This is a useful feature because the relative amount of user devices 18 operating the three different modes may change over time. For example, at times there may only be user devices 18 operating one mode of operation. The secondary precoder 24 on its own cannot fully achieve power balancing at the PAs 42, 44 on its own for all three modes of operation, but if the utilization of weights applied at the MIMO precoder 22 is restricted to the two $w_2$ weights for which power balancing is obtained, then power balancing at the PAs 42, 44 is achieved for all three modes of operation. This restriction may be applied either at the user device 18, which feeds back the preferred MIMO precoder weights, or at the BTS 14 which selects the actual MIMO precoder weights to use based on the feedback from the user device 18.

Figure 4:
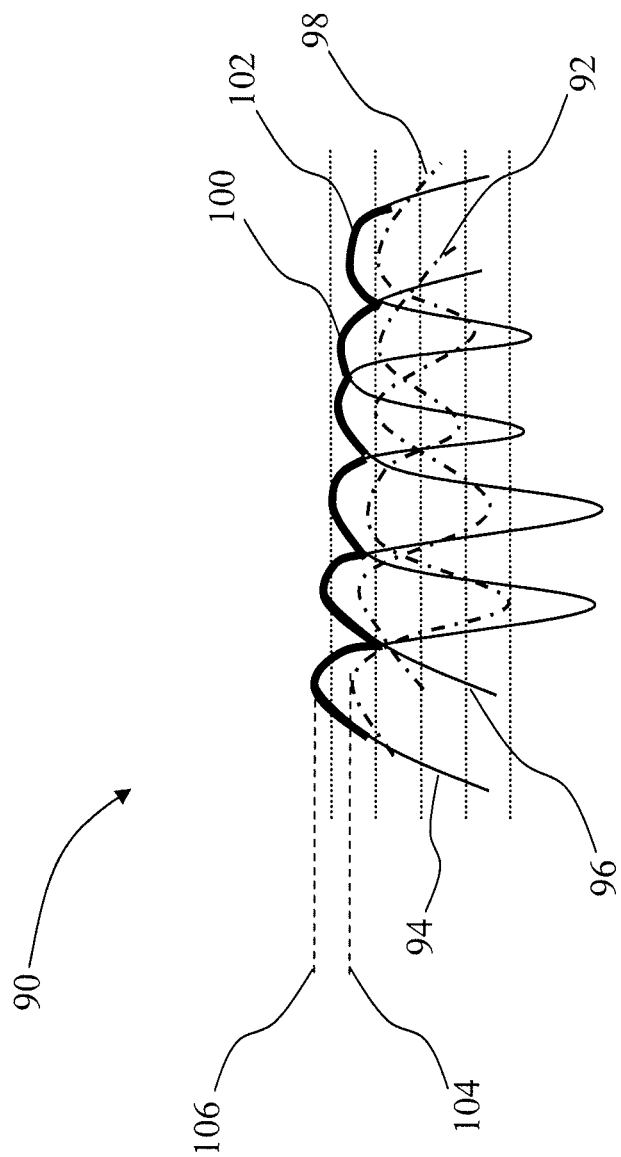
FIG. 4 is a series of graphs showing experimental results of fading with and with Space-Time Transmit Diversity (STTD) encoding.

FIG. 4 is a series of graphs showing experimental results of signal fading with and with Space-Time Transmit Diversity (STTD) encoding, generally designated 90. The y-axis for the graphs 90 represents a signal to noise ratio amplitude, and the x-axis represents time. The graphs 92 and 94 show fading with and without STTD encoding respectively for a first user. The graphs 96 and 98 show fading with and without STTD encoding respectively for a second user. The scheduling for transmitting data signals for the first and second users at respective fading peaks is shown by the thicker lines 100 and 102 at the peaks of the graphs 94, 96. Overall the graphs 90 show that the peaks when using STTD encoding, as shown at 104, are lower than the peaks when not using STTD encoding as shown at 106. This means that whereas the use of STTD encoding may alleviate the power balancing problem at the PAs 42, 44, and may be beneficial for common channels, there is less benefit when using STTD encoding for dedicated channels and the HS-DSCH. This is because STTD encoding may actually harm the bit rate for signals transmitted in certain cases such as on the HS-DSCH which is a shared and scheduled resource. Accordingly, the use of STTD encoding is a non-optimal solution for the HS-DSCH. Whereas STTD encoding is designed to reduce fast fading, in the case of a scheduled channel, such as the HS-DSCH, the use of STTD encoding may be harmful because the gain from scheduling stems from the fast fading. Accordingly, with the embodiments of the invention the use of STTD is not required when a secondary precoder 24 is applied after the MIMO precoder 22.

It will be appreciated that other MIMO codebooks may be used where the weights $w_1$, $w_2$, $w_3$, $w_4$ have different values to provide a different output from the MIMO precoder 22. Such a different codebook may solve power balancing issues at the PAs 42, 44. However, it is likely that the different codebook may result in sub-optimal polarization states for the MIMO signals transmitted from the antenna arrangement 16. In this scenario, it is envisaged that the secondary precoder 24 may be used to optimize the polarization states for the MIMO signals transmitted from the antenna arrangement 16 to provide a substantially orthogonal polarization of the signals from the antennas 16. Accordingly, the secondary precoder 24 may be used to solve the power balancing problem at the PAs 42, 44, and to resolve any sub-optimal polarizations for signals transmitted from the antenna arrangement 16.

It will be appreciated that the embodiments of the invention described above using the secondary precoder 24 have the advantage that power balancing is achieved at the PAs 42, 44. By applying the particular precoder matrix P described above, optimum performance is achieved for both MIMO and SISO signals. By excluding two MIMO precoding weights, power balancing at the PAs 42, 44 is achieved for single stream MIMO. Whereas the MIMO procoder 22 uses weights that are variable per user device 18 according to the 3GPP Standard 25.214, it will be appreciated that the secondary precoder 24 is operable with a fixed precoder matrix defined by P above.

The invention claimed is:

1. An antenna device for a radio base station, the device comprising a multiple-input multiple-output (MIMO) precoder and a secondary precoder in series therewith, the multiple-input multiple-output precoder having a first plurality of inputs for a plurality of multiple-input multiple-output data streams, and a first plurality of outputs for the plurality of data streams, the secondary precoder having a second plurality of inputs and a second plurality of outputs, the second plurality of inputs being in communication with the first plurality of outputs, each second plurality of inputs being in communication with each second plurality of outputs, wherein the antenna device is operable such that one or more signals input to a respective one or more of the second plurality of inputs provides a substantially equal power of signals at the second plurality of outputs.

2. The antenna device according to claim 1, wherein the second plurality of outputs are in communication with respective antennas, the secondary precoder being operable to precode a plurality of signals input to the second plurality of inputs with a precoder matrix to provide an orthogonal amplitude and phase relation between the signals when emitted from the antennas.

3. The antenna device according to claim 2, wherein the precoder matrix is defined by P:

$$P = \frac{1}{\sqrt{2}} \begin{pmatrix} 1 & e^{j\pi/4} \\ j & e^{-j\pi/4} \end{pmatrix}.$$

4. The antenna device according to claim 1, wherein the multiple-input multiple-output precoder is operable with a set of weights $w_1$, $w_2$, $w_3$, $w_4$ according to the Third Generation Partnership Project Technical Standard 25.214, the antenna device being operable to receive a non multiple-input multiple-output data stream to at least one of the second plurality of inputs and wherein the multiple-input multiple-output precoder is operable so that the $w_2$ weights $(1-j)/2$ and $(-1+j)/2$ are excluded to provide a substantially equal power of signals at the second plurality of outputs.

5. The antenna device according to claim 4, wherein the antenna device is operable such that the non multiple-input multiple output signal that is input to at least one of the second plurality of inputs is precoded at the second plurality of outputs to provide a polarization of the signals emitted from the antennas with substantially equal amplitudes for the horizontal and vertical polarisation components of its electric field vector.

6. The antenna device according to claim 1, wherein the multiple-input multiple-output precoder is operable with a set of weights $w_1$, $w_2$, $w_3$, $w_4$ according to the Third Generation Partnership Project Technical Standard 25.214, the antenna device being operable to receive a non multiple-input multiple-output data stream to at least one of the second plurality of inputs, and wherein a user device in communication with the antenna device is configured to report preferred multiple-input multiple-output precoder weights to the antenna device that provide a substantially equal power of signals at the second plurality of outputs.

7. The antenna device according to claim 1, wherein the secondary precoder is operable such that a plurality of signals input to the second plurality of inputs are precoded at the second plurality of outputs to provide a substantially vertical and horizontal polarization of the signals emitted from the antennas.

8. A method for precoding data in a multiple-input multiple-output (MIMO) system having a multiple-input multiple-output precoder and a secondary precoder in series therewith, the multiple-input multiple-output precoder having a first plurality of inputs for a plurality of multiple-input multiple-output data streams, and a first plurality of outputs for the plurality of data streams, the secondary precoder having a second plurality of inputs and a second plurality of outputs, the second plurality of inputs being in communication with the first plurality of outputs, each second plurality of inputs being in communication with each second plurality of outputs, and the second plurality of outputs being in communication with respective antennas, the method including:
   receiving one or more signals at a respective one or more of the second plurality of inputs; and
   precoding the said signals at the secondary precoder to provide a substantially equal power of the said signals at the second plurality of outputs.

9. The method according to claim 8, and further including precoding a plurality of signals input to the second plurality of inputs with a precoder matrix to provide an orthogonal amplitude and phase relation between the signals emitted from the antennas.

10. The method according to claim 9, wherein the precoder matrix is defined by P:

$$P = \frac{1}{\sqrt{2}} \begin{pmatrix} 1 & e^{j\pi/4} \\ j & e^{-j\pi/4} \end{pmatrix}.$$

11. The method according to claim 8, and further including operating the multiple-input multiple-output precoder with a set of weights $w_1$, $w_2$, $w_3$, $w_4$ according to the Third Generation Partnership Project Technical Standard 25.214, inputting a non multiple-input multiple-output data stream to at least one of the second plurality of inputs, and operating the multiple-input multiple-output precoder so that the $w_2$ weights $(1-j)/2$ and $(-1+j)/2$ are excluded to provide a substantially equal power of signals at the second plurality of outputs.

12. The method according to claim 11, and further including precoding the non multiple-input multiple output signal that is input to at least one of the second plurality of inputs to provide a polarization of the signals emitted from the antennas with substantially equal amplitudes for the horizontal and vertical polarisation components of its electric field vector.

13. The method according to claim 8, and further including operating the multiple-input multiple-output precoder with a set of weights $w_1, w_2, w_3, w_4$ according to the Third Generation Partnership Project Technical Standard 25.214, inputting a non multiple-input multiple-output data stream to at least one of the second plurality of inputs, and operating a user device in communication with the antenna device to report preferred multiple-input multiple-output precoder weights to the antenna device that provide a substantially equal power of signals at the second plurality of outputs.

14. The method according to claim 8, and further including precoding a plurality of signals input to at least one of the second plurality of inputs to provide a substantially vertical and horizontal polarization of the signals emitted from the antennas.

* * * * *